United States Patent [19]
Hanaoka

[11] Patent Number: 5,297,218
[45] Date of Patent: Mar. 22, 1994

[54] OPTICAL SEMICONDUCTOR LASER AND OPTICAL WAVEGUIDE ALIGNMENT DEVICE

[75] Inventor: Hideaki Hanaoka, Kanagawa, Japan

[73] Assignee: Sony Corporation, Tokyo, Japan

[21] Appl. No.: 992,976

[22] Filed: Dec. 18, 1992

[30] Foreign Application Priority Data

Dec. 20, 1991 [JP] Japan .................................. 3-338717

[51] Int. Cl.$^5$ .............................. G02B 6/12; H01S 3/04
[52] U.S. Cl. ........................................ 385/52; 385/14;
385/129; 385/130; 385/132; 372/36; 372/43;
372/50; 372/109
[58] Field of Search ....................... 385/14, 49, 50, 51,
385/52, 129, 130, 131, 132, 88, 92, 146; 372/43,
48, 49, 34, 36, 50, 7, 107, 109, 108

[56] References Cited

U.S. PATENT DOCUMENTS

| | | | |
|---|---|---|---|
| 4,079,404 | 3/1978 | Comerford et al. | 385/52 X |
| 4,546,478 | 10/1985 | Shimizu et al. | 372/36 |
| 4,589,116 | 5/1986 | Westermeier | 372/36 |
| 4,603,419 | 7/1986 | Shimizu et al. | 372/36 |
| 4,744,619 | 5/1988 | Cameron | 385/52 X |
| 4,914,667 | 4/1990 | Blonder et al. | 372/36 X |
| 5,015,051 | 5/1991 | Castera et al. | 385/14 X |
| 5,032,219 | 7/1991 | Buchmann et al. | 385/14 X |
| 5,043,991 | 8/1991 | Bradley | 372/32 |
| 5,121,457 | 6/1992 | Foley et al. | 385/52 X |
| 5,173,915 | 12/1992 | Kubota | 385/129 X |
| 5,179,566 | 1/1993 | Iwano et al. | 372/45 |
| 5,179,615 | 1/1993 | Tanaka et al. | 385/131 |

FOREIGN PATENT DOCUMENTS

2050896 1/1981 United Kingdom ............. 372/36 X

OTHER PUBLICATIONS

Abstracts of Japan, vol. 6, No. 215, Oct. 28, 1982, No. 57-118686 (Yamashita).
Japanese Abstracts, vol. 9, No. 49, Mar. 2, 1985, No. 59-188967.
Patent Abstracts of Japan, Publication No. JP 22 26783, (Sep. 1990) (Hayami).
Patent Abstracts of Japan, vol. 9, No. 284, Nov. 12, 1985, No. 60-127778.
Patent Abstracts of Japan Publication No. JP 63 156388 (Jun. 1988).
Patent Abstracts of Japan No. JP 31 71106 (Jul. 1991).

*Primary Examiner*—Brian Healy
*Attorney, Agent, or Firm*—Hill, Steadman & Simpson

[57] ABSTRACT

An optical waveguide device for optically coupling a semiconductor laser to an optical waveguide. An optical waveguide substrate having the optical waveguide therein is mounted on a smooth surface of a heat sink for the semiconductor laser on which surface the semiconductor laser is mounted so that a light entry end surface of the optical waveguide abuts against a light exit end surface of the semiconductor laser and that a surface of the optical waveguide substrate on the side where the optical waveguide is formed abuts against the smooth surface of the heat sink. Accordingly, accurate alignment between a light exit end of the semiconductor laser and a light entry end of the optical waveguide can be effected by a simple construction.

3 Claims, 3 Drawing Sheets

FIG. I
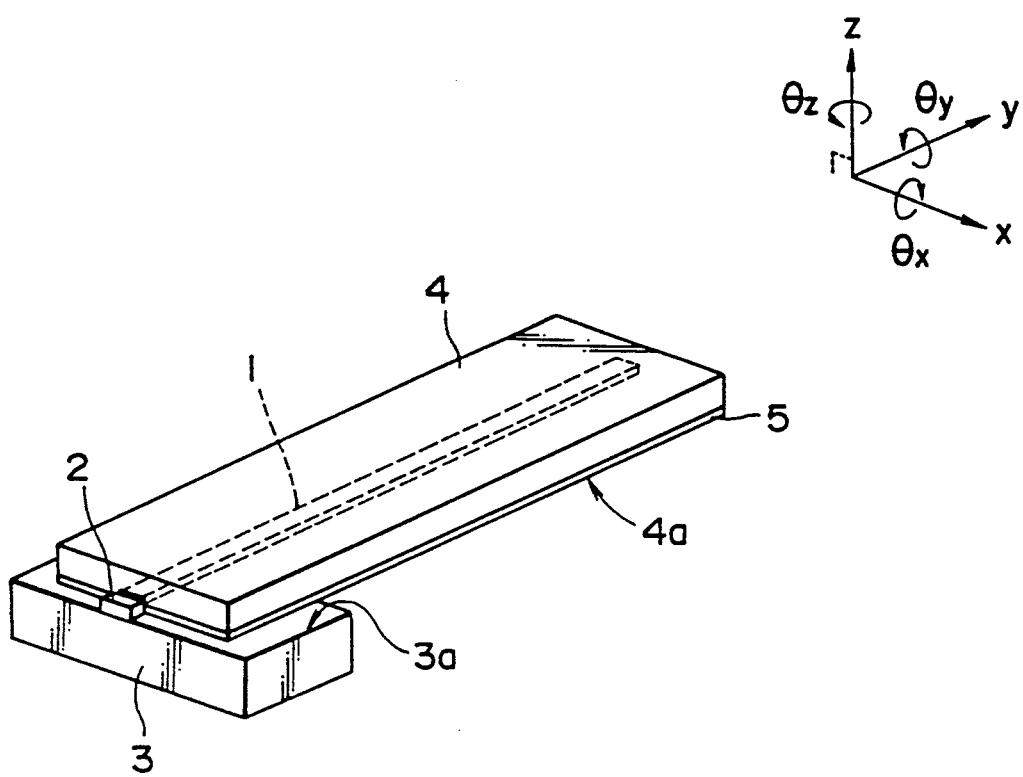
FIG. 2
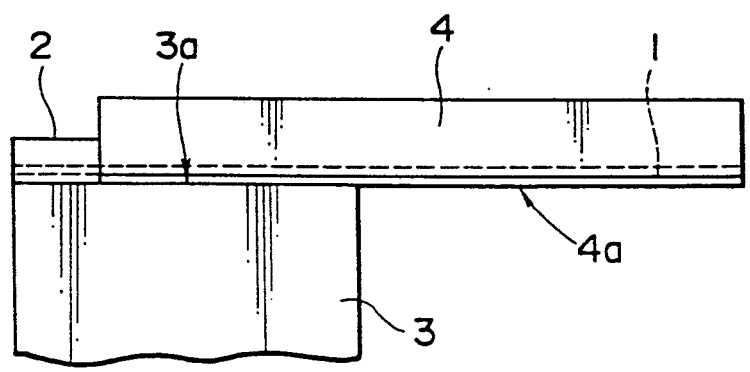

OPTICAL SEMICONDUCTOR LASER AND OPTICAL WAVEGUIDE ALIGNMENT DEVICE

BACKGROUND OF THE INVENTION

The present invention relates to an optical waveguide device, and more particularly to an optical waveguide device using a semiconductor laser beam as an incident light.

In a conventional optical waveguide device having an optical waveguide in an optical modulator, SHG (second harmonic generator), optical integrated circuit, etc., a semiconductor laser is used as an incident light source for the optical waveguide.

It is desired that the semiconductor laser and the optical waveguide are to be optically coupled together with the utmost coupling efficiency. It is therefore necessary to effect accurate alignment between a light exit end of the semiconductor laser and a light entry end of the optical waveguide.

There have conventionally been proposed various coupling methods considering such accurate alignment. In Japanese Patent Laid-open Publication No. 57-118686, for example, there is disclosed a structure that a semiconductor laser and an optical waveguide substrate are mounted on a common silicon substrate. In this structure, the alignment (equalization in level) between a light exit end of the semiconductor laser and a light entry end of the optical waveguide is effected by forming a recess on the silicon substrate and locating the semiconductor laser in this recess.

However, this prior art method has a problem in working such that a high accuracy is required in working the silicon substrate, for example.

SUMMARY OF THE INVENTION

It is accordingly an object of the present invention to provide an optical waveguide device which can effect the accurate alignment between a light exit end of a semiconductor laser and a light entry end of an optical waveguide substrate having an optical waveguide by adopting a simple construction or a simple manufacturing method.

The present invention is illustrated by way of example in FIG. 1 which is a schematic perspective view and in FIG. 2 which is a side view of FIG. 1. As illustrated in FIGS. 1 and 2, there is provided in an optical waveguide device for optically coupling a semiconductor laser 2 to an optical waveguide 1; the improvement wherein an optical waveguide substrate 4 having the optical waveguide 1 therein is mounted on a smooth surface 3a of a heat sink 3 for the semiconductor laser 2 on which surface the semiconductor laser 2 is mounted so that a light entry end surface of the optical waveguide 1 abuts against a light exit end surface of the semiconductor laser 2 and that a surface 4a of the optical waveguide substrate 4 on the side where the optical waveguide 1 is formed abuts against the smooth surface 3a of the heat sink 3. According to the above construction of the present invention, a center line of a light exit end of the semiconductor laser 2 and a center line of a light entry end of the optical waveguide 1 formed in the optical waveguide substrate 4 can be made to accurately coincide with each other to thereby effect optically efficient coupling.

Both ends of an optical resonator in the semiconductor laser 2, that is, both end surfaces of the semiconductor laser 2 are formed from a cleavage plane of a crystal. Therefore, the light exit end surface of the semiconductor laser 2 has a high flatness. On the other hand, a surface of the heat sink 3 on which the semiconductor laser 2 or a semiconductor chip is mounted is preliminarily polished to form the smooth surface 3a. Furthermore, the light entry end surface of the optical waveguide substrate 4 is also preliminarily polished to form a smooth surface having a high flatness.

In mounting the optical waveguide substrate 4 on the smooth surface 3a of the heat sink 3, the light entry end surface of the optical waveguide 1 is made to abut against the light exit end surface or the cleavage plane of the semiconductor laser 2, and the outer surface 4a of the optical waveguide substrate 4 on the side where the optical waveguide 1 is formed is made to abut against the smooth surface 3a of the heat sink 3. Accordingly, considering an x-axis, y-axis and z-axis intersecting one another at right angles as shown in FIG. 1, it is understood that the smooth surface 3a of the heat sink 3 is regarded as an x-y plane containing the x-axis and the y-axis both perpendicular to the z-axis, and that the light exit end surface of the semiconductor laser 2 is regarded as an x-z plane containing the x-axis and the z-axis both perpendicular to the y-axis. Therefore, the optical waveguide substrate 4 or the optical waveguide 1 abutting against both the smooth surface 3a of the heat sink 3 and the light exit end surface of the semiconductor laser 2 is positioned in the directions of the z-axis and the y-axis. Accordingly, relative to rotation $\theta_z$ about the z-axis, rotation $\theta_y$ about the y-axis and rotation $\theta_x$ about the x-axis, the optical waveguide 1 is set in position.

Accordingly, by positioning the optical waveguide 1 in respect to the direction of the x-axis only, the accurate alignment between the light exit end of the semiconductor laser 2 and the light entry end of the optical waveguide 1 can be easily effected.

Referring to FIG. 3 which shows a positional relationship between the light exit end of the semiconductor laser 2 and the light entry end of the optical waveguide 1, the light exit end (spot) SPL of the semiconductor laser 2 is positioned so that a distance $h_1$ from a surface of the semiconductor laser 2 fixed to the smooth surface 3a of the heat sink 3 (actually, this surface is a surface having one electrode of the semiconductor laser 2) to a center line of the light exit end SPL of the semiconductor laser 2 is set to about 3 μm. On the other hand, the light entry end of the optical waveguide 1 is positioned so that a distance $h_2$ from a surface $4a_1$ of an optical substrate 4s constituting the optical waveguide substrate 4 to a center line of the light entry end of the optical waveguide 1 is set to about 2.8 μm. As is ordinary, a buffer layer 5 formed from $SiO_2$ for example is formed on the surface $4a_1$ of the optical substrate 4s. A thickness of the buffer layer 5 is preliminarily set to 0.2 μm. Therefore, a distance H from the surface 4a of the optical waveguide substrate 4 (i.e., an outer surface of the buffer layer 5) to the center line of the light entry end of the optical waveguide 1 can be made equal to the distance $h_1$. Accordingly, the light exit end of the semiconductor laser 2 and the light entry end of the optical waveguide 1 can be accurately aligned with each other by positioning the optical waveguide 1 in the direction of the x-axis only.

Other objects and features of the invention will be more fully understood from the following detailed description and appended claims when taken with the accompanying drawings.

BRIEF DESCRIPTION OF THE DRAWINGS

FIG. 1 is a schematic enlarged perspective view of an optical waveguide device according to a preferred embodiment of the present invention;

FIG. 2 is a schematic enlarged side view of the optical waveguide device shown in FIG. 1;

DETAILED DESCRIPTION OF THE PREFERRED EMBODIMENTS

Figure 3:
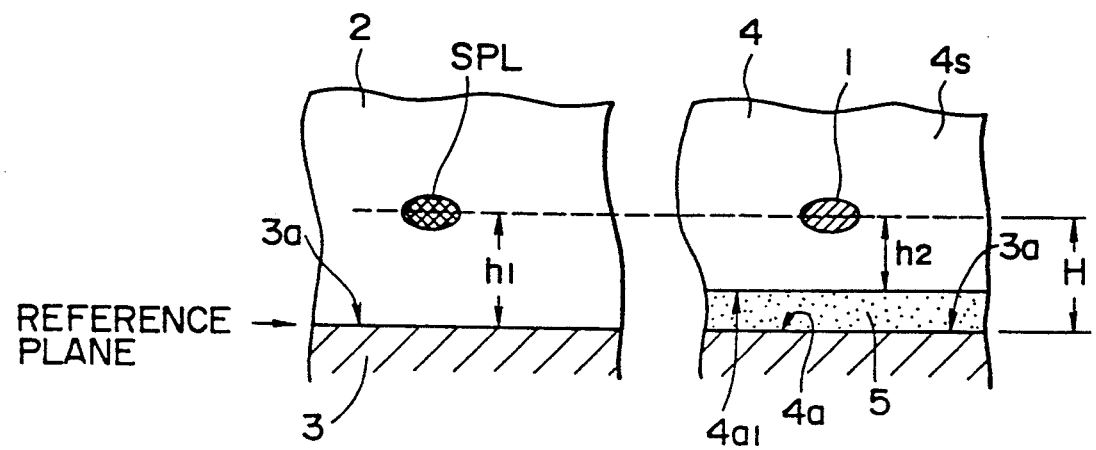
FIG. 3 is a schematic illustration of a positional relationship between a light exit end of a semiconductor laser and a light entry end of an optical waveguide according to the preferred embodiment.

The present invention will now be described in more detail with reference to the accompanying drawings which illustrate a preferred embodiment of the present invention. Referring to FIGS. 1 and 2, the optical waveguide substrate 4 having the optical waveguide 1 is mounted and bonded on the smooth surface 3a of the heat sink 3 for the semiconductor laser 2 in such a manner that the surface 4a of the optical waveguide substrate 4 on the side where the optical waveguide 1 is formed abuts against the smooth surface 3a of the heat sink 3 and that the light entry end surface of the optical waveguide substrate 4 abuts against the light exit end surface of the semiconductor laser 2.

Figure 4:
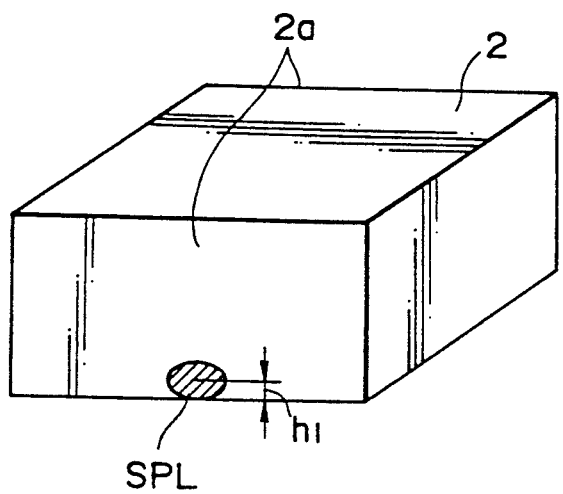
FIG. 4 is a schematic enlarged perspective view of the semiconductor laser according to the preferred embodiment.

As shown in FIG. 4, the semiconductor laser 2 or the semiconductor laser chip has a height of about 150 μm, a width of about 300 μm, and a length (resonator length) of about 250 μm. The light exit end surface of the semiconductor laser 2, that is, the end surface of the resonator is formed as a highly flat end surface 2a from a cleavage plane of crystal. The distance or height $h_1$ from the lower surface of the semiconductor laser 2 to the center line of the light exit end SPL on the end surface 2a is set to 3 μm as mentioned before.

Figure 5:
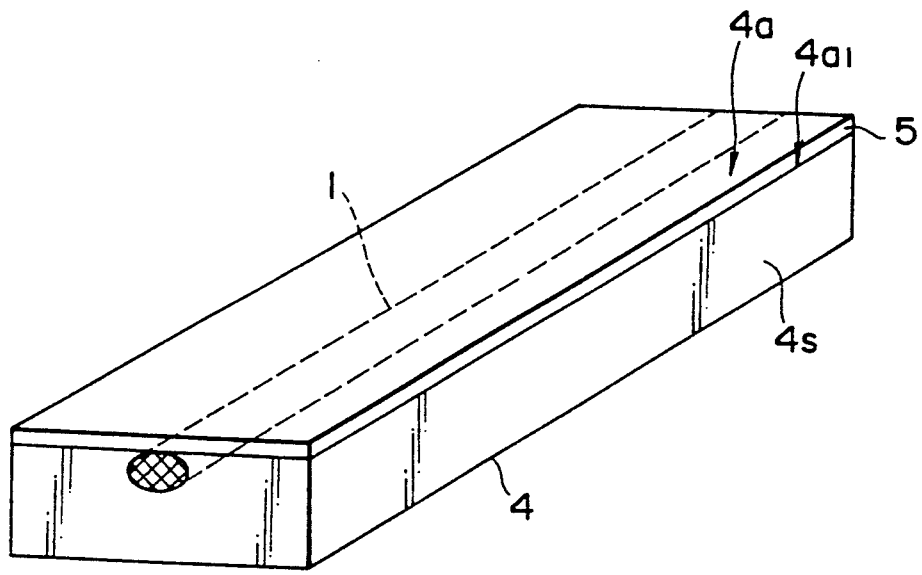
FIG. 5 is a schematic enlarged perspective view of an optical waveguide substrate according to the preferred embodiment.

As shown in FIG. 5, the optical waveguide substrate 4 is constituted of the optical substrate 4s and the buffer layer 5. The optical substrate 4s has a thickness of 1 mm and a width of 4 mm, and it is formed from crystal of lithium niobate, for example. The optical waveguide 1 is formed by selective thermal diffusion of Ti at about 1000° C. from the surface $4a_1$ of the optical substrate 4s.

The buffer layer 5 is formed of $SiO_2$ for example by plasma CVD, sputtering, etc. on the surface $4a_1$ of the optical substrate 4s. The buffer layer 5 of $SiO_2$ as by such a method can be easily manufactured as a film of the order of μm in thickness with an accuracy of 0.01 μm.

The material of the buffer layer 5 is not limited to $SiO_2$, but it may be suitably selected from any materials having a refractive index lower than that of the optical waveguide 1 and ensuring a reduced loss of light to be guided into the optical waveguide 1.

The heat sink 3 is formed of Cu which is superior in heat conductivity, and the surface thereof is polished to form the smooth surface 3a. A gold plating layer for example is formed on the smooth surface 3a, and one electrode (not shown) nearer to the resonator or an active layer in the semiconductor laser 2 is fused so as to be bonded to the gold plating layer.

The optical waveguide substrate 4 is bonded by resin or the like onto the smooth surface 3a of the heat sink 3 under the condition where the light entry end surface of the optical waveguide 1 abuts against the light exit end surface of the semiconductor laser 2 which surface is formed from a cleavage plane, and the outer surface of the buffer layer 5, i.e., the surface 4a of the optical waveguide substrate 4 abuts against the smooth surface 3a of the heat sink 3.

The thickness of the buffer layer 5 is preliminarily set so that as shown in FIG. 3 the distance $h_1$ from the smooth surface 3a of the heat sink 3 to the center line of the light exit end SPL of the semiconductor laser 2 becomes equal to the distance H from the outer surface of the buffer layer 5, i.e., the surface 4a of the optical waveguide substrate 4 to the center line of the light entry end of the optical waveguide 1.

With the above arrangement, as shown in FIG. 1, the optical waveguide substrate 4 is positioned in respect of the directions of the y-axis and the z-axis and regarding the angles $\theta_x$, $\theta_y$ and $\theta_z$ by the smooth surface 3a of the heat sink 3 and the light exit end surface or the cleavage plane of the semiconductor laser 2.

Accordingly, by positioning the optical waveguide substrate 4 relative to the direction of the x-axis as viewed in FIG. 1, the center line of the light exit end of the semiconductor laser 2 and the center line of the light entry end of the optical waveguide 1 in the optical waveguide substrate 4 can be made to accurately coincide with each other.

Further, the material of the optical substrate 4s constituting the optical waveguide substrate 4 is not limited to lithium niobate mentioned above, but it may be selected from any materials such as glass or semiconductor, depending upon an optical waveguide device to which the optical waveguide substrate 4 is to be applied.

As mentioned above, according to the present invention, since the optical waveguide substrate 4 is mounted on the heat sink 3 on which the semiconductor laser 2 is mounted, the structure and the assembling of the optical waveguide device is simple. Furthermore, since the optical waveguide substrate 4 is positioned by the light exit end surface of the semiconductor laser 2 which surface has a high flatness and by the smooth surface 3a of the heat sink 3, accurate alignment between the light exit end of the semiconductor laser 2 and the light entry end of the optical waveguide 1 in the optical waveguide substrate 4 can be effected to thereby achieve optically efficient coupling between the semiconductor laser 2 and the optical waveguide 1.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A laser aligning device comprising, an optical waveguide formed in an optical waveguide substrate, a laser, a heat sink with a smooth planar surface for aligning the output light of the laser with said optical waveguide wherein said laser has a planar light exit surface and a planar mounting surface which is normal to said light exit surface and said planar mounting surface of said laser is attached to said smooth planar surface of said heat sink, said optical waveguide substrate is formed with a planar light entry surface for said optical waveguide and said optical waveguide substrate is formed with a planar mounting surface which is normal to said planar light entry surface, and said planar mounting surface of said optical waveguide substrate is attached to said smooth planar surface of said heat sink such that said planar light entry surface abuts said light exit surface and so that light from said laser enters said optical waveguide.

2. The optical waveguide device as defined in claim 1, wherein said light exit end surface of said semiconductor laser is formed from a cleavage plane of a crystal.

3. A laser aligning device comprising, an optical waveguide formed in an optical waveguide substrate, a buffer layer attached to one surface of said optical waveguide substrate, a laser, a heat sink with a smooth planar surface for aligning the output light of the laser with said optical waveguide wherein said laser has a planar light exit surface and a planar mounting surface which is normal to said light exit surface and said planar mounting surface of said laser is attached to said smooth planar surface of said heat sink, said optical waveguide substrate is formed with a planar light entry surface for said optical waveguide and said buffer layer is formed with a planar mounting surface which is normal to said planar light entry surface, and said planar mounting surface of said buffer layer is attached to said smooth planar surface of said heat sink such that said planar light entry surface abuts said light exit surface and so that light from said laser enters said optical waveguide.

* * * * *